(12) United States Patent
Caunter et al.

(10) Patent No.: US 9,680,949 B2
(45) Date of Patent: Jun. 13, 2017

(54) REMOTE SELECTION AND AUTHORIZATION OF COLLECTED MEDIA TRANSMISSION

(71) Applicant: QUALCOMM Incorporated, San Diego, CA (US)

(72) Inventors: Mark Leslie Caunter, Christchurch (GB); Bruce Kelly Jackson, Bournemouth (GB); Steven Geach, Weymouth (GB)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/605,188

(22) Filed: Jan. 26, 2015

(65) Prior Publication Data

US 2015/0149599 A1 May 28, 2015

Related U.S. Application Data

(63) Continuation of application No. 12/141,645, filed on Jun. 18, 2008, now Pat. No. 8,977,710.

(51) Int. Cl.
*H04L 12/28* (2006.01)
*H04L 29/08* (2006.01)
(Continued)

(52) U.S. Cl.
CPC .......... *H04L 67/28* (2013.01); *H04L 12/2812* (2013.01); *H04L 12/2814* (2013.01);
(Continued)

(58) Field of Classification Search
CPC ......... H04L 67/04; H04L 67/28; H04L 67/32; H04L 67/42; H04L 12/28;
(Continued)

(56) References Cited

U.S. PATENT DOCUMENTS

| 5,812,865 A | 9/1998 | Theimer et al. |
| 6,079,020 A | 6/2000 | Liu |

(Continued)

FOREIGN PATENT DOCUMENTS

| JP | 2003030071 A | 1/2003 |
| WO | 2007145225 A1 | 12/2007 |

OTHER PUBLICATIONS

Atsushi, Nishioka, "Gateway Server Management System—Machine Translation of JP2003030071A".

(Continued)

*Primary Examiner* — Eric W Shepperd
(74) *Attorney, Agent, or Firm* — Shirin Tefagh

(57) ABSTRACT

A personal media system implemented as a tuple service allows remote access, selection, authorization, and transmission of personal media stored in a collection on a home network across a network to a guest network. A mobile client device enables browsing/searching for content, shows media players within a domain, finds a media player within a domain for a given media type, gets a media object, and renders a media object on a given media player within a domain. Each gateway has an agent that registers to the server and responds to commands from the server. The server acts as a hub for moving digital content objects between domains, provides media services on behalf of domains (e.g., transcoding, proxy streaming, etc.), provides a web interface to mobile client devices for control over user domains, sends commands to the personal media agents, and creates an accessible set of domains for a user.

30 Claims, 6 Drawing Sheets

(51) Int. Cl.
*H04L 29/06* (2006.01)
*H04W 12/08* (2009.01)

(52) U.S. Cl.
CPC .......... *H04L 12/2818* (2013.01); *H04L 63/10* (2013.01); *H04L 67/32* (2013.01); *H04W 12/08* (2013.01)

(58) Field of Classification Search
CPC .. H04L 12/2803–12/2818; H04L 12/46; H04L 12/2604; H04L 12/4616; H04L 12/462; H04L 12/4633; H04L 29/00; H04L 29/02; H04L 29/06176; H04L 29/0621; H04L 29/06224; H04L 29/06231; H04L 29/06244; H04L 29/06823
See application file for complete search history.

(56) References Cited

U.S. PATENT DOCUMENTS

| | | | |
|---|---|---|---|
| 6,751,619 B1 | 6/2004 | Rowstron et al. | |
| 7,055,170 B1 | 5/2006 | Karmouch et al. | |
| 7,076,478 B2 | 7/2006 | O'Rourke et al. | |
| 7,483,438 B2 | 1/2009 | Serghi et al. | |
| 7,675,923 B2 | 3/2010 | Rossi et al. | |
| 7,941,131 B2* | 5/2011 | Malik | H04N 7/173 455/41.2 |
| 8,145,532 B2 | 3/2012 | Plastina et al. | |
| 8,307,100 B2 | 11/2012 | Tanimoto | |
| 9,438,567 B1* | 9/2016 | Barraclough | H04L 63/0428 |
| 2001/0003191 A1 | 6/2001 | Kovacs et al. | |
| 2002/0016848 A1 | 2/2002 | Yoshimine et al. | |
| 2002/0075844 A1 | 6/2002 | Hagen | |
| 2002/0087887 A1 | 7/2002 | Busam et al. | |
| 2002/0143855 A1 | 10/2002 | Traversat et al. | |
| 2003/0005130 A1* | 1/2003 | Cheng | H04L 12/2805 709/228 |
| 2004/0034807 A1 | 2/2004 | Rostowfske | |
| 2004/0143672 A1 | 7/2004 | Padmanabham et al. | |
| 2004/0177136 A1 | 9/2004 | Chen et al. | |
| 2004/0207719 A1 | 10/2004 | Tervo et al. | |
| 2004/0215611 A1* | 10/2004 | Jawa | G06F 17/3002 |
| 2004/0225897 A1 | 11/2004 | Norton | |
| 2005/0021817 A1 | 1/2005 | Shimizu et al. | |
| 2005/0033850 A1* | 2/2005 | Kirkland | H04L 29/06027 709/228 |
| 2005/0111486 A1 | 5/2005 | Lee et al. | |
| 2005/0216865 A1* | 9/2005 | Rollin | G06F 3/04847 715/839 |
| 2005/0229245 A1 | 10/2005 | Nakano et al. | |
| 2005/0235334 A1 | 10/2005 | Togashi et al. | |
| 2005/0283536 A1* | 12/2005 | Swanson | G06Q 10/10 709/232 |
| 2006/0031206 A1 | 2/2006 | Deubel et al. | |
| 2006/0133392 A1 | 6/2006 | Ajitomi et al. | |
| 2006/0168264 A1 | 7/2006 | Baba et al. | |
| 2006/0168656 A1* | 7/2006 | Stirbu | H04L 12/2834 726/15 |
| 2006/0190402 A1 | 8/2006 | Patron et al. | |
| 2006/0236097 A1* | 10/2006 | Prologo | H04L 63/0823 713/156 |
| 2006/0242256 A1 | 10/2006 | Gray et al. | |
| 2007/0115996 A1 | 5/2007 | Shitano et al. | |
| 2007/0136778 A1* | 6/2007 | Birger | G11B 19/025 725/117 |
| 2007/0201511 A1 | 8/2007 | Saito et al. | |
| 2007/0211734 A1 | 9/2007 | Yang et al. | |
| 2007/0234416 A1 | 10/2007 | Matsuoka et al. | |
| 2007/0237115 A1 | 10/2007 | Bae et al. | |
| 2008/0071919 A1 | 3/2008 | Gupta et al. | |
| 2008/0117922 A1* | 5/2008 | Cockrell | H04L 12/66 370/401 |
| 2008/0320573 A1* | 12/2008 | Turnbull | G06F 21/31 726/6 |
| 2009/0129301 A1 | 5/2009 | Belimpasakis | |
| 2009/0222514 A1 | 9/2009 | Igarashi | |
| 2009/0319599 A1 | 12/2009 | Caunter et al. | |
| 2010/0153726 A1* | 6/2010 | Liu | H04L 9/083 713/171 |
| 2010/0268761 A1* | 10/2010 | Masson | H04L 65/4084 709/203 |

OTHER PUBLICATIONS

Costa, P., et al., "TeenyLIME: transiently shared tuple space middleware for wireless sensor networks," In Proceedings of the international workshop on Middleware for sensor networks, pp. 43-48, ACM, 2006. [retrieved from ACM database on Mar. 10, 2013].

Heredia E "An Overview of the DLNA Architecture" Spring 2008,Washington, Rally Technologies [www.microsoft.com/rally],2006.

International Search Report and Written Opinion—PCT/US2009/047205, International Search Authority—European Patent Office—Nov. 11, 2009.

Lakshmanan, et al., "On multi-gateway association in wirless mesh networks" in Wirless Mesh Networks, 2006. WiMesh 2006, pp. 64-73 [retrieved from the Internet= http://www.ece.gatech.edu/research/GNAN/archive/2006/wimesh06.pdf on May 21, 2010].

Lawrence "Digital gateway for multimedia home neyworks", Telecommunications Systems Journal, Aug. 2003. [retrieved from the Internet= http://www.springerlink.com/content/h36011l3v62h4527/ on May 21, 2010].

\* cited by examiner

REMOTE SELECTION AND AUTHORIZATION OF COLLECTED MEDIA TRANSMISSION

CROSS-REFERENCE TO RELATED APPLICATIONS

The present Application for Patent is a Continuation of patent application Ser. No. 12/141,645 entitled "REMOTE SELECTION AND AUTHORIZATION OF COLLECTED MEDIA TRANSMISSION" filed Jun. 18, 2008, pending, and assigned to the assignee hereof and hereby expressly incorporated herein by reference in its entirety.

BACKGROUND

Field

The described aspects relate to networked communications and more particularly to remote controlling streaming media selection and authorization between private networks.

Background

Increasingly, people are building up collections of digital media, such as audio files, video files, digital images, etc. While portable memory devices such as thumb drives, CD-R disks, and MP3 players have provided some capability to physically carry such files from place to place for use, often such memory devices are too limited in carrying capacity as well as being too easily lost or stolen for entrusting with sensitive data files. Still, collectors of digital media would benefit from being able to access their collections without the necessity of setting up an elaborate network bridge. For example, a fully capable computing platform may not be available at the visited location for such bridging or the collector may lack the expertise or permissions to set up such a bridge. Malicious access to a collection also needs to be prevented.

SUMMARY

The following presents a simplified summary in order to provide a basic understanding of some aspects of the present disclosure. This summary is not an extensive overview and is intended to neither identify key or critical elements nor delineate the scope of such aspects. Its purpose is to present some concepts of the described aspects in a simplified form as a prelude to the more detailed description that is presented later.

In accordance with one or more aspects and corresponding disclosure thereof, various features are described in connection with use of a client device, such as a handheld communication device, as a remote control for searching for and selecting personal media content stored on a home network. The user can direct transmission through a network for playing on a guest network.

In one aspect, a method is provided to facilitate communications between devices of two discrete privately addressed networks, wherein each of the two discrete privately addressed networks are coupled via a publicly addressed network and each have a corresponding gateway that operably couples to the publicly addressed network. A client device is registered to a media content server coupled to the publicly addressed network. The registered client device is associated with a first gateway corresponding to the first one of the two discrete privately addressed networks that stores personal media content. In response to user input to the client device received by the media content server, the client device is associated with a second gateway corresponding to the second one of the two discrete privately addressed networks. In response to a user input to the client device received by the media content server, personal media content is selected for transmission from the first gateway to the second gateway via the media content server.

In other aspects, at least one processor includes modules for performing the communication facilitating method. A computer program product includes sets of instructions for performing the communication facilitating method. An apparatus providing means for performing the communication facilitating method.

In another aspect, an apparatus facilitates communications between devices of two discrete privately addressed networks, wherein each of the two discrete privately addressed networks are coupled via a publicly addressed network and each have a corresponding gateway that operably couples to the publicly addressed network. The apparatus includes a media content server coupled to the publicly addressed network that registers a client device. A first association component associates the registered client device with a first gateway corresponding to the first one of the two discrete privately addressed networks and storing personal media content. A second association component associates the client device with a second gateway corresponding to the second one of the two discrete privately addressed networks in response to user input to the client device received by the media content server. A media content transmission component selects personal media content for transmission from the first gateway to the second gateway via the media content server in response to a user input to the client device received by the media content server.

In another aspect, a method controls communications between devices of two discrete privately addressed networks, wherein each of the two discrete privately addressed networks are coupled via a publicly addressed network and each have a corresponding gateway that operably couples to the publicly addressed network. A client device requests registration of a client device to a media content server coupled to the publicly addressed network. Client device information is sent sufficient for associating the registered client device with a first gateway corresponding to the first one of the two discrete privately addressed networks that stores personal media content. A user input with the client device is sent to the media content server for associating the client device with a second gateway corresponding to the second one of the two discrete privately addressed networks. A user input with the client device is sent to the media content server for selecting personal media content for transmission from the first gateway to the second gateway via the media content server.

In other aspects, at least one processor includes modules for performing the communication control method. A computer program product includes sets of instructions for performing the communication control method. An apparatus providing means for performing the communication control method.

In yet a further aspect, an apparatus controls communications between devices of two discrete privately addressed networks, wherein each of the two discrete privately addressed networks are coupled via a publicly addressed network and each have a corresponding gateway that operably couples to the publicly addressed network. A communication component remotely communicates with a media content server coupled to the publicly addressed network that registers a client device. A user interface requests association of the registered client device with a first gateway corresponding to the first one of the two discrete privately addressed networks and storing personal media content and for requesting association of the client device with a second gateway corresponding to the second one of the two discrete privately addressed networks. A media content transmission component execute in the user interface selects personal media content for transmission from the first gateway to the second gateway via the media content server.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects and versions may be employed. Other advantages and novel features will become apparent from the following detailed description when considered in conjunction with the drawings and the disclosed versions are intended to include all such aspects and their equivalents.

DETAILED DESCRIPTION

Figure 1:
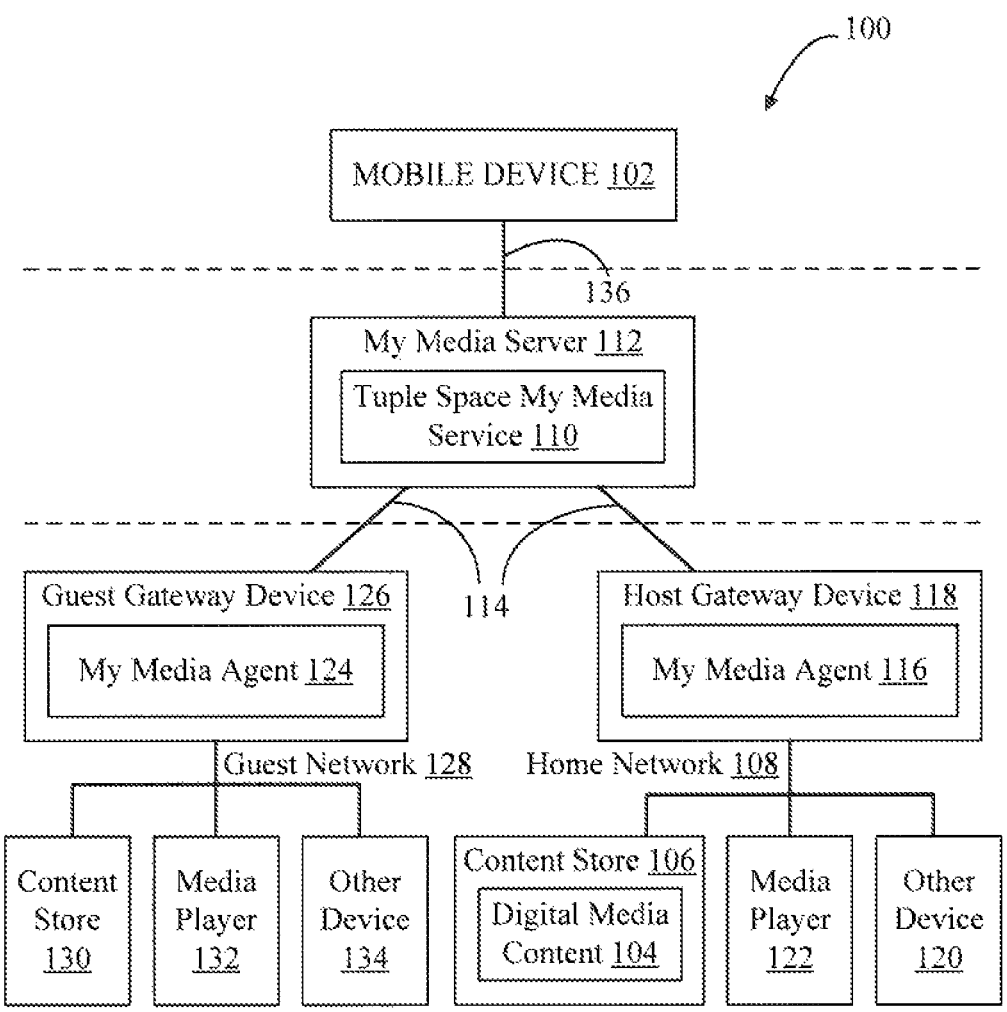
FIG. 1 is a schematic diagram of a mobile device acting as a personal media server of a personal media system between a home network and a guest network as part of a communication network, according to one aspect.

A personal media system implemented as a tuple service allows remote access, selection, authorization, and transmission of personal media stored in a collection on a home network across a network (e.g., Internet) to a guest network. A mobile client device (e.g., smart cell phone) provides a graphical user interface to browse/search for content, to show media players within a domain, to find a media player within a domain that can handle a media type (e.g., MP3), to get a media object, and to render a media object on a given media player within a domain. Each gateway has a personal media agent that registers to the personal media server and responds to commands from the server. The server acts as a hub for moving digital content objects between domains, provides media services on behalf of domains (e.g., content transcoding, proxy streaming services, etc.), provides a web interface to mobile client devices to allow control over user domains, sends commands to the personal media agents, and creates a set of domains that are accessible to a particular user.

Various aspects are now described with reference to the drawings. In the following description, for purposes of explanation, numerous specific details are set forth in order to provide a thorough understanding of one or more aspects. It may be evident, however, that the various aspects may be practiced without these specific details.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a personal media system 100 that allows a client mobile device 102 to remotely browse/search and render digital media content 104 stored in a content store 106 on a home network (domain) 108 without the necessity for the mobile device 102 to duplicate even a portion of media content 104. This interactivity is facilitated via an interface 136 by a personal media service ('My Media Service') 110, implemented on a personal media server ('My Media Server') 112, that interfaces across a distributed network (e.g., the Internet) 114 to a personal media agent ('My Media Agent') 116 executed as a software component on a host gateway device 118 of the home network 108. The host gateway device 118 manages other devices 120, in particular a media player 122. The gateway device 118 can be a home personal computer (PC), a networked multi-media entertainment system, or other devices such as an Open Services Gateway initiative (OSGi) device, which is a Java-based service platform that can be remotely managed.

The personal media service 110 also interfaces across the distributed network 114 to a personal media agent ("My Media Agent") 124 executed as a software component on a guest gateway device 126 of a guest network (domain) 128. The guest gateway device 126 manages the guest network 128, such as a media content store 130, a media player 132, and other devices 134. A user subscribes to the personal media service 110 through a web interface, such as through the host gateway device 118 or through the mobile device 102 as depicted. The personal media service 110 can validate details given for the mobile device 102, such as through short message service (SMS).

It should be appreciated that the mobile device 102 can provide a "remote control" access to a user's personal media on a home gateway device 118 that is not otherwise convenient as a user interface. Further, a user can gain access, either permanent or temporary, to a "foreign" domain, such as the guest gateway device 126. In one aspect, the user could enter the foreign domain into the mobile device 102. The command is passed from the server 112 to the agent 124 in the guest gateway device 126, providing details of the user who has requested access and asking for access rights for that user. For applications in which the guest gateway device 126 has insufficient user interface capabilities, this command may result in another form of communication (e.g., short message service (SMS)) to the owner of the guest gateway device 126 to allow access rights. If accessed is allowed, the guest gateway device ("domain") is added to the user's domain, which can include expiration criteria or other access constraints such as types of operations permitted. If the user wishes to play media content between home and guest domains, the server 112 can be responsible for fetching the media content 104 from one domain 108 and rendering it on a player 132 in the other domain 128 by appropriate commands to the agents 116, 124.

With further reference to the personal media service 110 connected to the network 114, a distributed computer system, such as but not limited to the Internet, is characterized by rapid, real-time interchange among many dissimilar processes executing simultaneously on a large array of dissimilar and geographically diverse processors. A distributed computer system's resources are usually spatially separated, and the execution of its applications often involves multiple execution threads that can be widely separated in time. To address some of the challenges of writing applications for use on distributed computer systems, tuple space based coordination languages were developed. In the illustrative version, the personal media service 110 is implemented in tuple space. Thereby, the personal media service 110 can overcome challenges in dissimilarities in the home and guest domains 108, 128 that would otherwise complicate, if not entirely preclude, such remotely searching and accessing personal media content.

A "tuple space" is a globally shared, associatively addressed memory space that is organized as a grouping of tuples. A "tuple" is the basic element of a tuple space system. In the context of a tuple space based coordination language like Linda, a tuple is a vector having fields or values of certain types. In a broader sense, a "tuple" is an entry in an information storage system. For example, a row in a relational database system can be referred to as a tuple.

In Linda-like languages, constructs called "templates" are used to associatively address tuples via matching techniques. A template matches a tuple if they have an equal number of fields and if each template field matches the corresponding tuple field.

Tuple space based coordination languages provide a simple yet powerful mechanism for inter-process communication and synchronization, which is the crux of parallel and distributed programming A process with data to share generates a tuple and places it into the tuple space. A process requiring data simply requests a tuple from the tuple space.

Tuple space programs may be easier to write and maintain for a number of reasons including the following:

(1) Destination uncoupling (fully anonymous communication)—the creator of a tuple requires no knowledge about the future use of that tuple or its destination.

(2) Spatial uncoupling—because tuples are retrieved using an associative addressing scheme, multiple address-space-disjoint processes can access tuples in the same way.

(3) Temporal uncoupling—tuples have their own life span, independent of the processes that generated them or any processes that may read them. This enables time-disjoint processes to communicate seamlessly.

Figure 2:
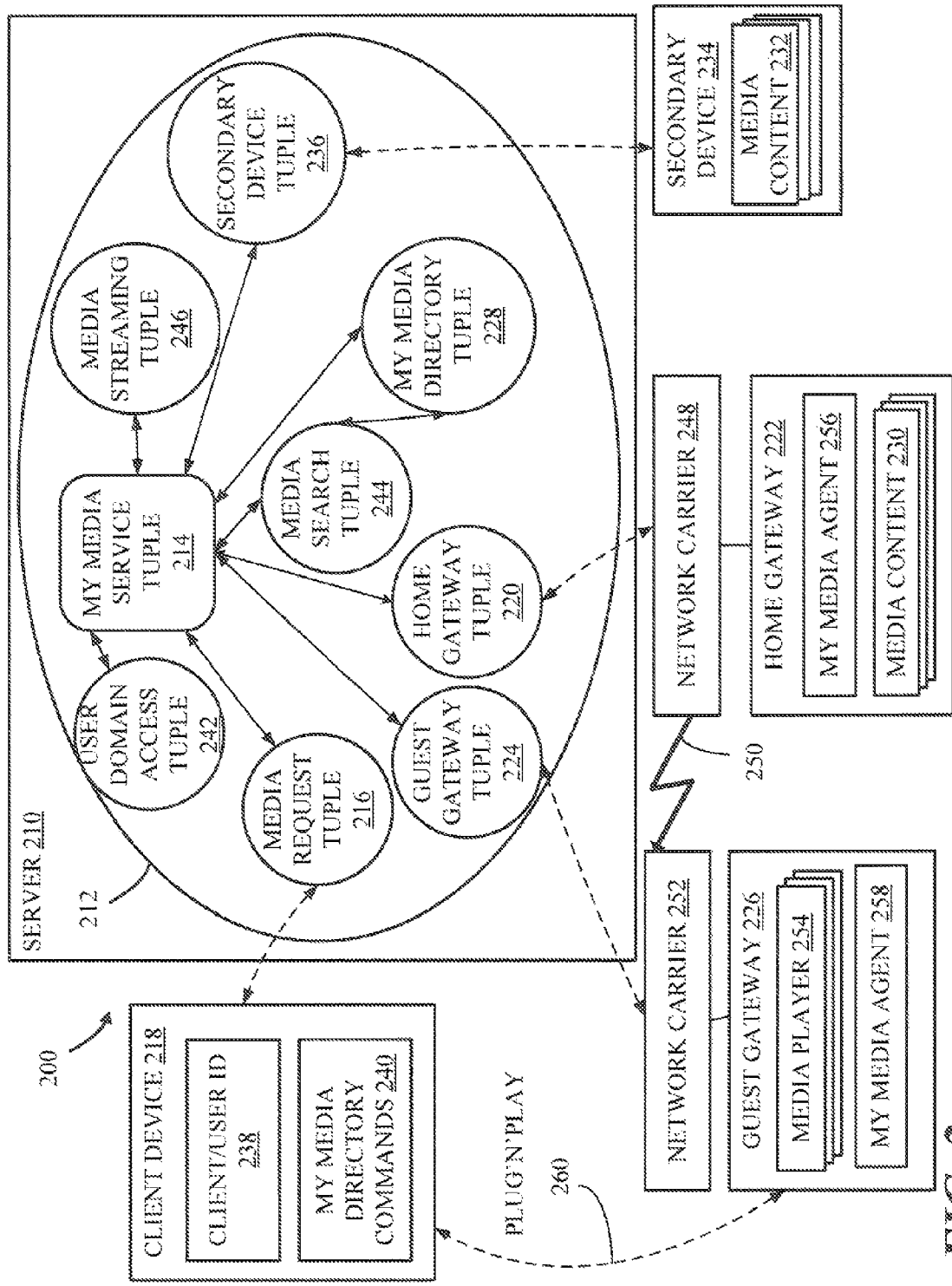
FIG. 2 is a schematic diagram of one aspect of a communication network operable with the system of FIG. 1.

Referring to FIG. 2, in one illustrative aspect that leverages certain advantages of tuple space, a system 200 for personal media includes a server 210 that hosts a tuple space 212 having a personal media service tuple ('my media service tuple') 214 operable to evaluate a plurality of data tuples received by tuple space 212, depicted as a media request tuple 216 from a client device 218, a home gateway tuple 220 from a home gateway 222, and a guest gateway tuple 224 from a guest gateway 226. A data tuple ('my media directory tuple') 228 indexes personal media content 230 stored on the home gateway 222, as well as perhaps personal media content 232 on a secondary device 234 (e.g., digital locker) accessed via a secondary device tuple 236.

The media request tuple 216 can incorporate client/user identification data 238 and "my media directory commands" 240 from the client device 218. The my media service tuple 214 authenticates the user identification data 238 against user domain access tuple 242 and invokes a media search tuple 244 to locate the requested media, such as from the my media directory tuple 228 or perhaps other search engine interfaces (not shown).

If the command from the client device 218 indicates selection and transmission, then my media service tuple 214 can utilize a media streaming tuple 246 to correctly format the media content 230 for transmission from a network carrier 248 that supports the home gateway 222 across a communication channel 250 (e.g., the Internet) to a network carrier 252 that supports the guest gateway 226. For instances in which the guest gateway 226 has more than one default media player 254 associated with the media type being transmitted (e.g., streamed), the client device 218 can advantageously select the desired destination. Facilitating the interfaces between tuple space 212 and the other participants in the personal media system 200 are a "my media" agent 256 hosted by the home gateway 222 and a "my media" agent 258 hosted by the guest gateway 226.

In order to increase the types of legacy guest gateways 226 that can benefit from aspects of the present disclosure, the client device 218 can include a local communication link (e.g., wired or wireless plug'n'play connection) 260. The client device 218 can thereby assist in identifying a previously loaded my media agent 258 already accessible by the my media service tuple 214. Alternatively, the client device 218 can assist in the installation of the my media agent 258 either via the network carrier 252 or from local storage on the client device 218. In addition, the client device 218 can serve as a communication channel between the tuple space 212 and the guest gateway 226 for instances in which a network connection is not available or desired to be used.

The tuple space 212 comprises an abstract space operable to receive data objects and includes a predetermined set of operations that can be performed within the space. For example, the predetermined set of functions may include an "in" function and a "rd" function, which both take input parameters that allow the selection of specific tuples in the space by matching the input parameters, where given, with those values present within the tuple space. Additionally, both the "in" and "rd" functions may have non-blocking equivalents (inp and rdp). In some aspects, the predetermined set of functions may include a set of operations, such as JAVA methods, that may be performed on both tuple space 212 and tuples.

Further, in a specific example, each tuple is an instance of a com.qualcomm qspaces.linda.Tuple class or subclass, and is created with a set of attributes, defined by an array of objects which are specified when the tuple is constructed. The array can be zero-length, however, in some aspects, the array may not be null. In addition, in some aspects, none of the individual attribute objects in the array may be null.

In some aspects, when the respective tuple is first constructed, and every time the respective attributes are retrieved from the respective tuple, the array of objects may be defensively copied using a very fast form of in-memory serialization. This process allows the respective tuple to be immutable, and therefore, guarantees the integrity of tuple space 212 in which the respective tuple resides.

In the above-noted aspects, tuple equality adheres to the same equality principles of any JAVA object, including the symmetry rule which states that if t1.equals(t2) then t2.equals(t1).

Specifically, a tuple equals another tuple, e.g. t1.equals (t2), if t2, known as a template, meets the following criteria:
1) The class of the template t2 is the same class as the tuple t1.
2) The attributes of the template t2 are equal to the attributes of the tuple t1, meaning that t2's attributes are the same as t1's attributes, irrespective of their order.

In other aspects, a tuple matches another tuple, e.g. t1.matches(t2), if t2, known as a template, meets the following criteria:
1) The class of the template t2 is the same class or a super class of the tuple t1.
2) The attributes of the template t2 match the attributes of the tuple t1, meaning that t2's attributes are the same set or a subset of t1's attributes, irrespective of their order.

In one example, when matching one tuple with another, the symmetry rule does not apply; so, t1.matches(t2) does not necessarily equate to t2.matches(t1).

In some aspects, the comparison of one set of tuple attributes with another uses the normal object equality rules, so any object used as a tuple attribute implements the object.equals(Object obj) and object.hashcode( ) methods.

A respective tuple is added to tuple space 212 with a lease. Lease is a period of time, for example specified in milliseconds, which defines how long the tuple will remain in the respective tuple space 212. For example, lease having a value of zero may indicate that the respective tuple never expires. Once lease has expired for a respective tuple, the tuple is automatically removed from tuple space 212.

Service tuples 214 represent services that interact with clients of the tuple space 212, such as client devices 218. Further, service tuples are also autonomous 'live' JAVA objects in their own right, which may also interact with tuple space 212 and other tuples in the space. Service tuples 214 may be discovered in the same manner as other tuples, e.g. by matching the class and attributes of the tuple. In some aspects, service tuples 214 may not be used in this way, however, rather service tuples 214 are interacted with indirectly by placing other tuples, such as data tuples 216, 220, and 224, into tuple space 212.

For example, a client, such as a respective client device 218, may create data tuple 216, 220 and 224 of class A with attributes "abc" and "123," and places the tuple into tuple space 212. As such, data tuple 216 can be described using the following notation:

(A, "abc", 123).

As described previously, service tuple 214 is a live object which can interact with tuple space 212 in the same way as a client application. As such, in this example, service tuple 214 has been instantiated and is blocking on a read from tuple space 212 for any tuples with a matching template for class A and any attributes. Such a matching criterion can be described as follows:

(A, ?s, ?x)

where ?s and ?x mean that any values of the string s and the integer x will be matched. Consequently, tuple space 212 matches the template from service tuple 214, and will then read tuple A from tuple space 212. In this manner, the described aspects pass parameters in the form of tuples to a service. More specifically, in the described aspects, service tuple 214 includes matching template that monitors tuple space 212 for any tuples having tuple type corresponding to a data class, thereby identifying data tuples. Further, matching template allows for identified data tuples to have any attributes.

Figure 3:
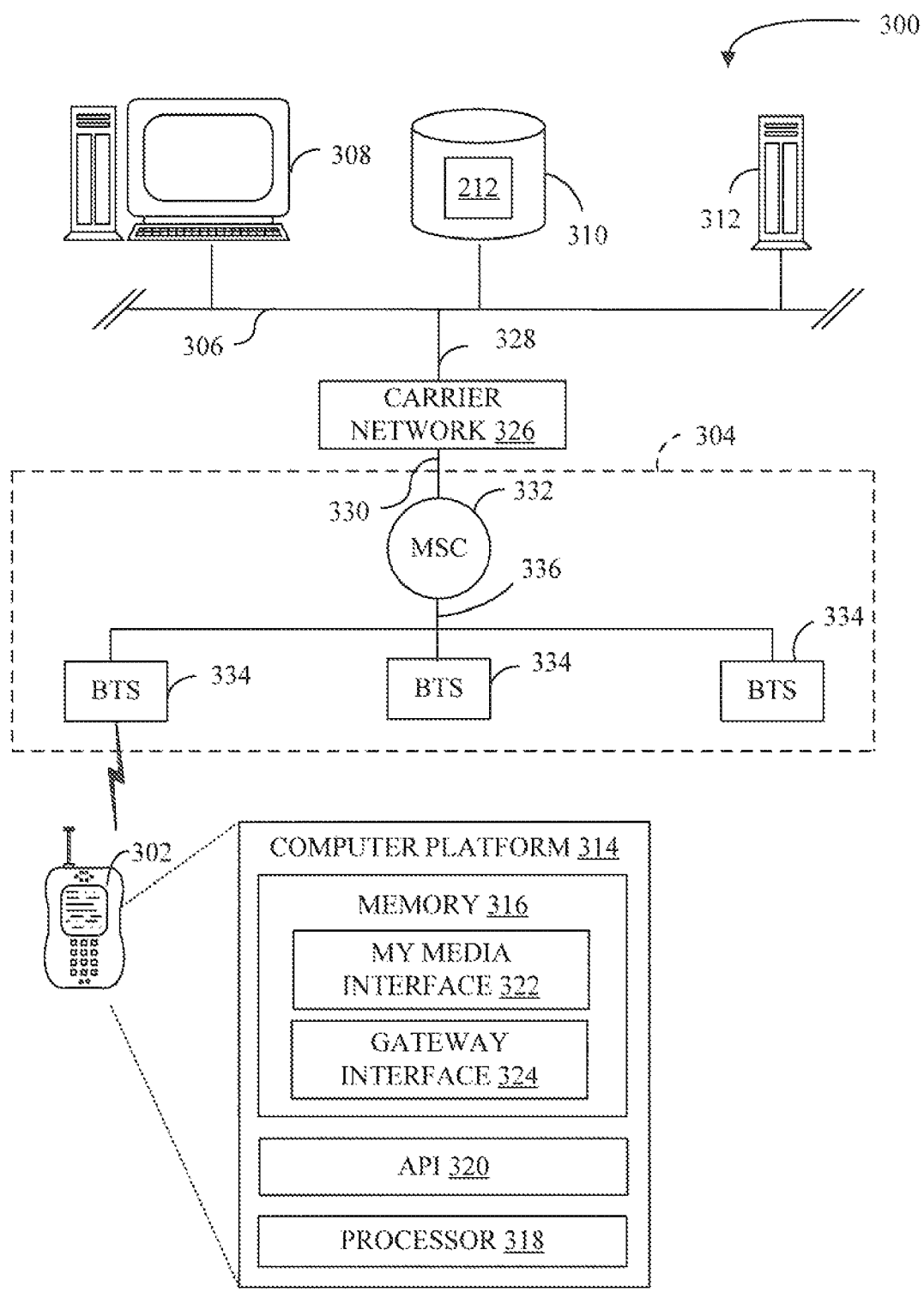
FIG. 3 is a depiction of a graphical user interface of the mobile device for user interaction with the my media system of FIG. 1, according to one aspect.

Referring to FIG. 3, for example, a communications network 300 includes one or a plurality of client devices 302, wireless telephone devices in this case, utilizes a wireless network 304 to communicate with wired network 306 (e.g. a local area network, LAN) having network device or server 308 and/or storage device 310 and/or data source 312. One or both of network device/server 308 and/or storage device 310 may include tuple space 212 and some portions the above-discussed components of system 200 (FIG. 2). Further data source 312 may include a processor and a memory in communication with the processor, wherein the memory comprises a tuple generation module having tuple generation logic operable to generate a plurality of data tuples from any source of data operable to facilitate media content searching, retrieval, streaming, etc., such as a web-based transactional service. In particular, wireless device 302 includes a computer platform 314 having a memory 316 in communication with a processor 318, such as via an application programming interface (API) 320 that enables interaction with any resident applications, such as a my media interface 322 that generates user-related data and a user identifier, and a gateway interface 324 that enables direct plug'n'play interfacing to a gateway 118, 126 (FIG. 1).

Wireless network 304 is connected to wired network 306 via a carrier network 326. Network device or server 308 and/or storage device 310 and/or data source 312 may be present on communications network 300 with any other network components that are desired to provide community management capabilities and/or cellular telecommunication services. Network device or server 308 and/or storage device 310 and/or data source 312 may communicate with carrier network 326 through a data link 328, which may be the Internet, a secure LAN, WAN, or other network. Carrier network 326 controls messages (generally being data packets) sent to a mobile switching center (MSC) 332. Further, carrier network 326 communicates with MSC 332 by the network 330, such as the Internet, and/or POTS (plain old telephone service). For example, in network 330, a network, or Internet portion transfers data, and the POTS portion transfers voice information. MSC 332 may be connected to multiple base stations (BTS) 334 by another network 336, such as a data network and/or Internet portion for data transfer and a POTS portion for voice information. BTS 334 ultimately broadcasts messages wirelessly to the wireless communication devices 302, for example using predetermined voice and/or data packet services, such as Code Division Multiple Access (CDMA) and short messaging service (SMS), respectively, or any other over-the-air methods. Thus, communication network 300, in combination with system 200 (FIG. 2), allow for the discovery, creation and management of electronic or on-line user media access based on relationships discovered between data objects in a tuple space.

It should be noted that FIG. 3 is a representative diagram that more fully illustrates the components of a wireless communication network and the interrelation of the elements of one aspect of the present system. Communications network 300 is merely exemplary and can include any system whereby remote modules, such as wireless communication devices 302, communicate over-the-air between and among each other and/or between and among other components of a wireless and/or wired network, including, without limitation, wireless network carriers, and/or servers.

Figure 4:
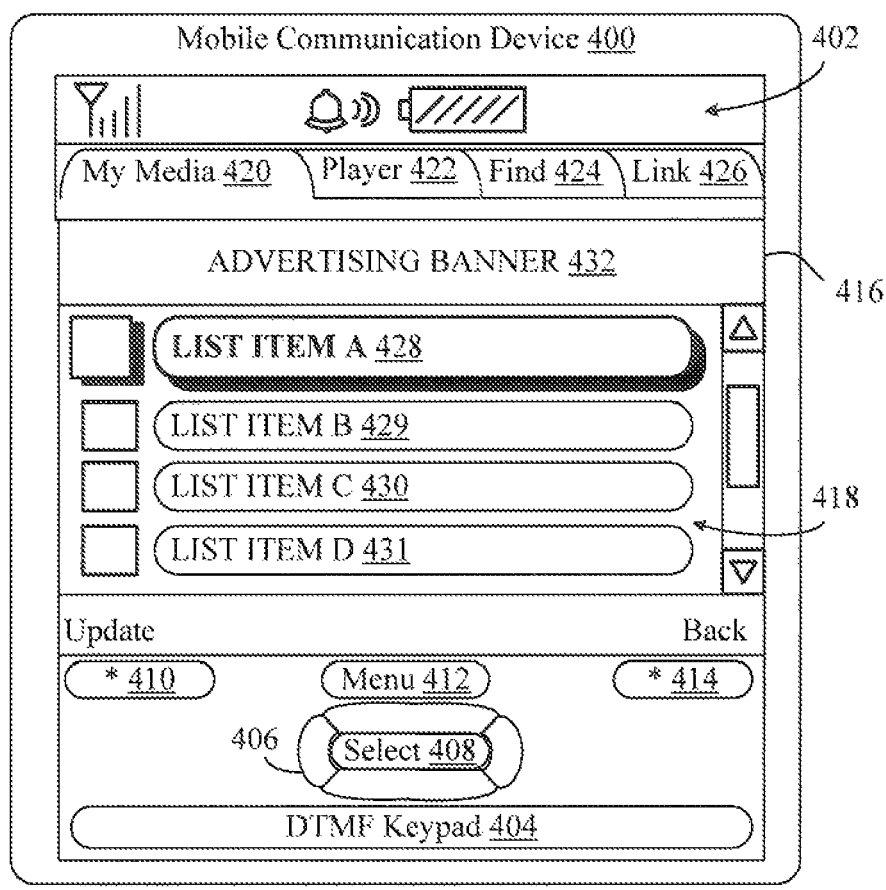
FIG. 4 is a state diagram of the graphical user interface of the personal media system of FIG. 3, according to one aspect.

In FIG. 4, an illustrative mobile communication device 400 can serve as client device for remotely accessing and controlling personal media content via a graphical user interface (GUI) 402, which can include physical controls such as dial tone multi-function (DTMF) keypad 404, with four cursor keys 406 and select button 408, and left, middle and right menu buttons 410, 412, and 414. The GUI 402 can include a display 416 as depicted. Alternatively, a display with touch screen capability can also be used to provide soft input controls (not shown). The display 416 can depict a personal media content index 418 organized under a hierarchy of tabs of my media tab 420, player selection tab 422, a find media search tab 424 and a gateway linking tab 426. For example, under the my media tab 420, list items A-D 428-431 can be a listing of media types (e.g., audio, video, images, etc.), artists, album titles, genres, playlists, song titles, etc. Advertising banners 432, that can be interactive, are advantageously selected to correspond to media purchase opportunities or collateral services related to a media listing being depicted.

Figure 5:
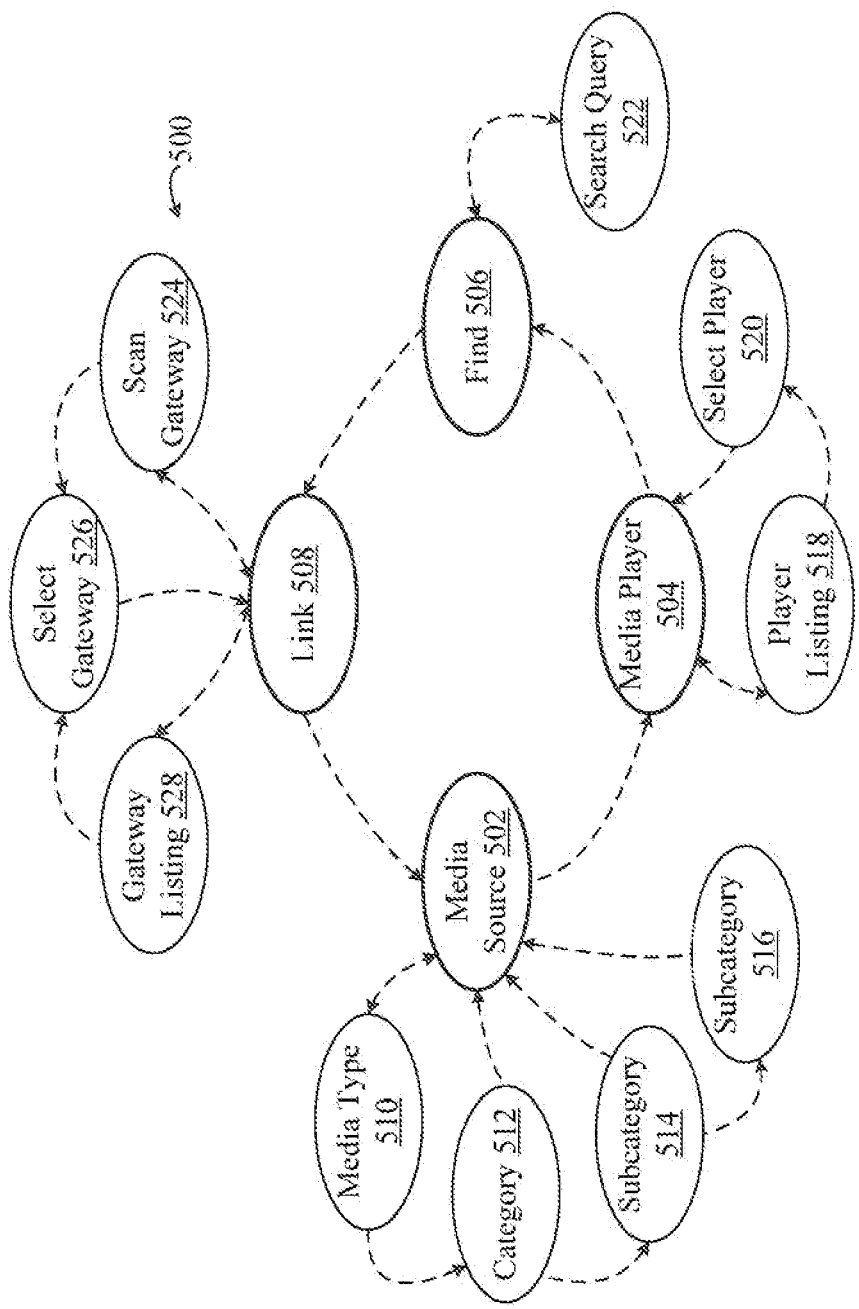
FIG. 5 is a schematic diagram of a tuple space that implements the personal Media system on the personal media server of FIG. 1, according to one aspect.

In FIG. 5, in another illustrative aspect, a user can navigate through various GUI states 500 to interact with the personal media system 200 (FIG. 2). An inner hierarchical loop is comprised of a media source state 502, a media player state 504, a find state 506, and a link state 508. From the media source state 502, sub-tier states are reached of media type state 510, a media category state 512, a media subcategory state 514, and a lower subcategory state 516. From the media player state 504, sub-tier states are reached of player listing 518 and a select player state 520. From the find state 506, a search query state 522 can be reached. From the link state 508, a scan gateway state 524, select gateway state 526, and a gateway listing state 528 can be reached.

Figure 6:
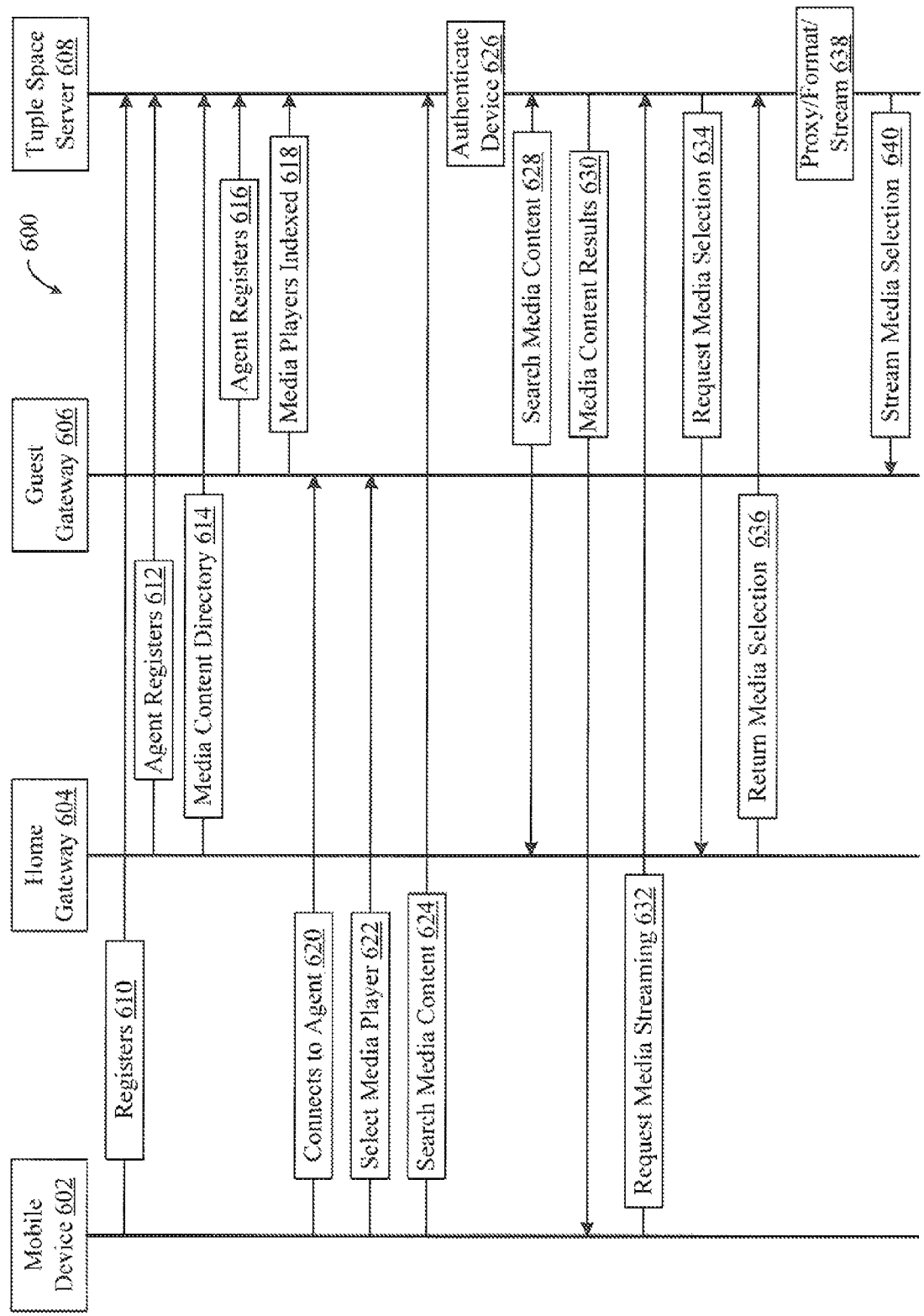
FIG. 6 is a timing diagram of illustrative interactions between a mobile device, home gateway, guest gateway, and a tuple space server of the My Media system, according to one aspect.

In FIG. 6, in a further aspect of a personal media system 600, an illustrative pattern of communications is depicted between a mobile device 602, a home gateway 604, a guest gateway 606, and a tuple space server 608. As depicted at 610, the mobile device 602 registers with the tuple space server 608. A user subscribes to the my media service by registering through a web interface, either via a mobile device 602 or via a web browser. When through a web browser, details can be entered to identify the mobile device 602. A user interface widget can be bundled with the mobile device 602 to facilitate the controls and display.

As depicted at 612, the home gateway 604 registers with the tuple space server 608. Registering can activate a bundled software agent already present on the mobile device 602 or be followed by downloading of the my media agent for execution on the home gateway 604. When the agent connects to the server 608 for the first time, the user's registration details can be provided, thus giving the home domain of the home gateway 604 a well-known identity (e.g., "Bruce's house"). This identity is tied to the user's mobile device 602 by the server 608. As depicted at 614, the home gateway 604 provides media content directory data to the tuple space server 608. As depicted at 616, perhaps assisted by the mobile device 602, the guest gateway 606 registers to the server 608. As depicted at 618, the guest gateway 606 has its media players indexed with the tuple space server 608. As depicted at 620, the mobile device 602 connects to the agent hosted on the guest gateway 606, either directly or via the tuple space server 608 or other networked connection. Similarly, as depicted at 622, the mobile device 602 selects a media player connected to the guest gateway 606.

As depicted at 624, the user can use the mobile device 602 to search media content indexed by the tuple space server 608. The Tuple space server 608 in turn authenticates the mobile device 602 as depicted at 626. As depicted at 628, the tuple space server 608 either obtains the index of media content from the home gateway 604 in the first instance, updates the index, or verifies the communication channel for retrieving the media. The tuple space server 608 returns to the mobile device 602 the requested media content results, as depicted at 630. Upon selection by the mobile device 602 of media content for transmission (e.g., streaming) as depicted at 632, the tuple space server 608 responds as depicted at 634 by accessing or requesting the media selection from the home gateway 604, which is returned as depicted at 636. The tuple space server 608 can advantageously proxy, format and/or stream as depicted at 638 to prepare the content for transfer, which is then depicted at 640 as going to the guest gateway.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for remotely controlling access to media content, comprising:
   registering a mobile device with a media content server by sending a registration to the media content server, wherein the registration enables the media content server to tie the mobile device to a home domain;
   transmitting, using the mobile device, to the media content server, a media content search query, wherein the media content search query is a query of indexed media content that is indexed to the home domain;
   receiving from the media content server, responsive to the media content search query, a media content listing, wherein the media content listing includes one or more elements of the indexed media content;
   receiving, using the mobile device, a user command to play media content from the media content listing on a media player in the guest domain, wherein the media player is in a guest domain device other than the mobile device; and
   sending, to the media content server, a command to play the media content from the home domain on the media player in the guest domain.

2. The method of claim 1, further comprising providing a media search user interface on the mobile device.

3. The method of claim 1, further comprising depicting the media content listing via a graphical user interface on the mobile device, wherein the media content listing includes a personal media content index.

4. The method of claim 1, further comprising depicting the media content listing via a graphical user interface on the mobile device, wherein the media content listing includes a listing of media types, a listing of artists, a listing of album titles, a listing of genres, a listing of playlists, a listing of song titles, or a combination thereof.

5. The method of claim 1, further comprising:
   sending a command to the media content server directing the media content server to provide a list of media players within the guest domain;
   receiving, using the mobile device, a user input selecting the media player; and
   transmitting, to the guest domain, data identifying the selected media player.

6. The method of claim 1, further comprising registering the mobile device at the guest domain.

7. The method of claim 1, wherein the mobile device does not duplicate any portion of the media content.

8. A mobile device, comprising:
   a processor; and
   a memory coupled to the processor and storing processor-executable instructions configured to cause the processor to:
      register the mobile device with a media content server by sending a registration to the media content server, wherein the registration enables the media content server to tie the mobile device to a home domain;
      transmit, using the mobile device, to the media content server, a media content search query, wherein the media content search query is a query of indexed media content that is indexed to the home domain;
      receive from the media content server, responsive to the media content search query, a media content listing, wherein the media content listing includes one or more elements of the indexed media content;
      receive, using the mobile device, a user command to play media content from the media content listing on a media player in the guest domain, wherein the media player is in a guest domain device other than the mobile device; and send, to the media content server, a command to play the media content from the home domain on the media player in the guest domain.

9. The mobile device of claim 8, wherein the memory further stores processor-executable instructions configured to cause the processor to provide a media search user interface on the mobile device.

10. The mobile device of claim 8, wherein the memory further stores processor-executable instructions configured to cause the processor to depict the media content listing via a graphical user interface on the mobile device, wherein the media content listing includes a personal media content index.

11. The mobile device of claim 8, wherein the memory further stores processor-executable instructions configured to cause the processor to depict the media content listing via a graphical user interface on the mobile device, wherein the media content listing includes a listing of media types, a listing of artists, a listing of album titles, a listing of genres, a listing of playlists, a listing of song titles, or a combination thereof.

12. The mobile device of claim 8, wherein the memory further stores processor-executable instructions configured to cause the processor to provide a graphical user interface on the mobile device to find a media player, within the guest domain, which can handle a specific media type.

13. The mobile device of claim 8, wherein the memory further stores processor-executable instructions configured to cause the processor to send a command to the media content server directing the media content server to provide a list of media players within the guest domain.

14. The mobile device of claim 8, wherein the memory further stores processor-executable instructions configured to:
cause the processor to receive a user input identifying the media content as a selected search result;
receive, using the mobile device, a user input selecting the media player; and
transmit, to the guest domain, data identifying the selected media player.

15. The mobile device of claim 8, wherein the memory further stores processor-executable instructions configured to cause the processor to register the mobile device at the guest domain.

16. The mobile device of claim 8, wherein the memory further stores processor-executable instructions configured to cause the processor to not duplicate any portion of the media content.

17. A mobile device configured to remotely control access to media content, comprising:
means for registering the mobile device with a media content server by sending a registration to the media content server, wherein the registration enables the media content server to tie the mobile device to a home domain;
means for transmitting, using the mobile device, to the media content server, a media content search query, wherein the media content search query is a query of indexed media content that is indexed to the home domain;
means for receiving from the media content server, responsive to the media content search query, a media content listing, wherein the media content listing includes one or more elements of the indexed media content;
means for receiving, using the mobile device, a user command to play media content from the media content listing on a media player in the guest domain, wherein the media player is in a guest domain device other than the mobile device; and
means for sending, to the media content server, a command to play the media content from the home domain on the media player in the guest domain.

18. The mobile device of claim 17, further comprising means for providing a media search user interface on the mobile device.

19. The mobile device of claim 17, further comprising means for depicting the media content listing, wherein the media content listing includes a personal media content index.

20. The mobile device of claim 17, further comprising means for depicting the media content listing, wherein the media content listing includes a listing of media types, a listing of artists, a listing of album titles, a listing of genres, a listing of playlists, a listing of song titles, or a combination thereof.

21. The mobile device of claim 17, further comprising:
means for sending a command to the media content server directing the media content server to provide a list of media players within the guest domain;
means for receiving, using the mobile device, a user input selecting the media player; and
means for transmitting, to the guest domain, data identifying the selected media player.

22. The mobile device of claim 17, further comprising means for registering the mobile device at the guest domain.

23. The mobile device of claim 17, further comprising means for causing the mobile device to not duplicate any portion of the media content.

24. A non-transitory computer-readable medium, comprising processor-executable instructions stored thereon configured to cause a processor to:
register a mobile device with a media content server by sending a registration to the media content server, wherein the registration enables the media content server to tie the mobile device to a home domain;
transmit, using the mobile device, to the media content server, a media content search query, wherein the media content search query is a query of indexed media content that is indexed to the home domain;
receive from the media content server, responsive to the media content search query, a media content listing, wherein the media content listing includes one or more elements of the indexed media content;
receive, using the mobile device, a user command to play media content from the media content listing on a media player in the guest domain, wherein the media player is in a guest domain device other than the mobile device; and
send, to the media content server, a command to play the media content from the home domain on the media player in the guest domain.

25. The non-transitory computer-readable medium of claim 24, wherein the instructions are further configured to cause the processor to provide a media search user interface on the mobile device.

26. The non-transitory computer-readable medium of claim 24, wherein the instructions are further configured to cause the processor to depict the media content listing via a graphical user interface on the mobile device, wherein the media content listing includes a personal media content index.

27. The non-transitory computer-readable medium of claim 24, wherein the instructions are further configured to cause the processor to depict the media content listing via a graphical user interface on the mobile device, wherein the media content listing includes a listing of media types, a listing of artists, a listing of album titles, a listing of genres, a listing of playlists, a listing of song titles, or a combination thereof.

28. The non-transitory computer-readable medium of claim 24, wherein the instructions are further configured to:
cause the processor to send a command to the media content server directing the media content server to provide a list of media players within the guest domain;
receive, using the mobile device, a user input selecting the media player; and
transmit, to the guest domain, data identifying the selected media player.

29. The non-transitory computer-readable medium of claim 24, wherein the instructions are further configured to cause the processor to register the mobile device at the guest domain.

30. The non-transitory computer-readable medium of claim 24, wherein the instructions are further configured to cause the processor to cause the mobile device to not duplicate any portion of the media content.

* * * * *